Figure 1:
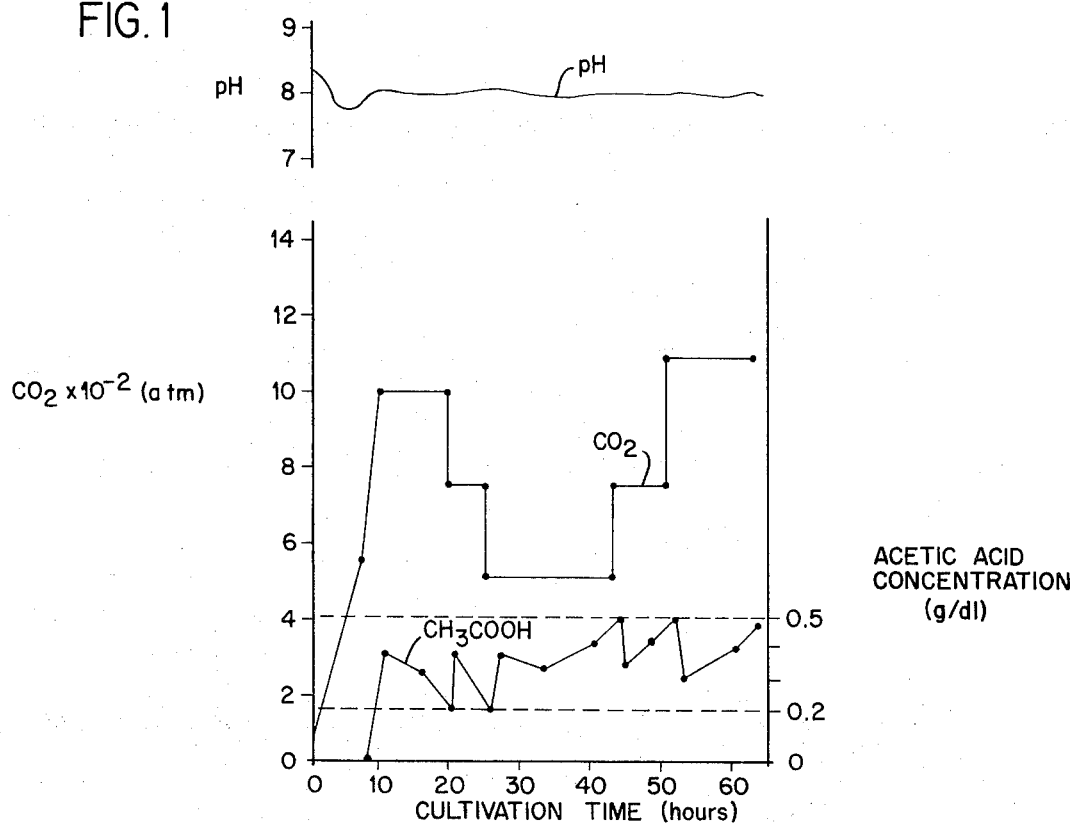

United States Patent [19]
Ikeda et al.

[11] 3,766,010
[45] Oct. 16, 1973

[54] METHOD FOR CONTROLLING FERMENTATION PROCESS

[75] Inventors: Shigeho Ikeda; Ayaaki Ishi-Zaki, both of Kawasaki; Yoshio Hirose, Fujisawa, all of Japan

[73] Assignee: Ajinomoto Co., Inc., Tokyo, Japan

[22] Filed: Aug. 16, 1972

[21] Appl. No.: 281,043

[30] Foreign Application Priority Data
Aug. 26, 1971  Japan.............................. 46/65453
Sept. 14, 1971  Japan.............................. 46/71433

[52] U.S. Cl....................... 195/30, 195/66, 195/118
[51] Int. Cl.............................................. C12b 1/20
[58] Field of Search.............................. 195/118, 30

[56] References Cited
UNITED STATES PATENTS
3,582,471  6/1971  Shiio et al........................ 195/30 R
3,121,669  2/1964  Baptist.............................. 195/118

Primary Examiner—Alvin E. Tanenholtz
Attorney—Kurt Kelman et al.

[57] ABSTRACT

In a fermentation medium, in which an organic acid is consumed as a carbon source by a microorganism and is added to the medium at a rate to maintain a set pH value, the concentration of the acid is held within limits required for optimum fermentation conditions by varying the concentration of bicarbonate ions in the medium. The bicarbonate concentration is increased at excessive organic acid concentration by increasing the partial pressure of carbon dioxide in the fermentation vessel or by raising the set pH limit at which the organic acid is fed to the medium. The bicarbonate concentration is reduced at insufficient organic acid concentration by decreasing the partial carbon dioxide pressure in the fermentation vessel or by lowering the set pH limit.

4 Claims, 3 Drawing Figures

METHOD FOR CONTROLLING FERMENTATION PROCESS

This invention relates to a method for controlling a fermentation process, and particularly to a method for holding the concentration of an organic acid which is continuously or intermittently fed to a culture medium as a carbon source within a range suitable for microbial growth and for the desired fermentation.

Fermentation in a culture medium is known to be impaired by an excessive concentration of an organic acid employed as a carbon source and to be retarded by a deficiency of the carbon source. Thus it is necessary to control the concentration within a fairly narrow optimum range.

It is most convenient to replenish a culture medium with an organic acid when the pH of the culture medium rises beyond a certain level by microbial consumption of organic acid. However, it is very difficult by this method to control the concentration of organic acid within a desired range, since there are many factors influencing the pH of a culture medium other than microbial consumption of organic acid.

On the other hand, when the concentration of organic acid is accurately controlled by varying the feeding rate the pH of the culture medium cannot be controlled within a desired range. Therefore, it has been very difficult heretofore to control both the pH of a culture medium and the concentration of organic acid.

It has now been found that the concentration of organic acid can be accurately controlled with a permissible change in pH of the culture medium, when the organic acid is fed as a carbon source to a fermentation vessel so as to maintain the pH of the culture medium below a certain level and by increasing or decreasing the concentration of bicarbonate ions.

The concentration of bicarbonate ions can be controlled by changing the partial pressure of carbon dioxide in the fermentation vessel and/or by changing the pH limit set for feeding organic acid.

The relationship between the concentration of organic acid and the concentration of bicarbonate ions is illustrated in Table 1 by experimental data. The experiments were carried out by the method described in Example 1.

TABLE 1

| $CO_2$ (atm) | $HCO_3^-$ (m mole) | $CH_3COO^-$ (m mole) |
|---|---|---|
| 0.017 | 26 | 162 |
| 0.021 | 41 | 145 |
| 0.031 | 51 | 122 |
| 0.055 | 105 | 77 |
| 0.078 | 135 | 47 |

The concentration of bicarbonate ions was controlled by changing the partial pressure of carbon dioxide.
The pH of the liquid culture medium was maintained within the range from 7.8 to 8.0.

TABLE 2

| pH of Medium | $HCO_3^-$ (m mole) | $CH_3COO^-$ (m mole) |
|---|---|---|
| 7.75 | 67 | 300 |
| 8.00 | 118 | 231 |
| 8.25 | 210 | 101 |
| 8.50 | 374 | 0 |

The concentration of bicarbonate ions was controlled by changing the set pH limit.
The partial pressure of carbon dioxide was controlled at about 0.08 atm.

It can be seen from Tables 1 and 2 that the concentration of acetate ions is decreased by increasing the concentration of bicarbonate ions, and that the concentration of bicarbonate ions is increased by increasing the partial pressure of carbon dioxide or by changing the pH limit to a higher level.

The fermentation process of this invention is carried out as follows:

Small amounts of organic acid solution are fed to a culture medium so as to maintain the pH below a certain level.

When the concentration of organic acid ion rises above the range desirable for fermentation, the concentration of bicarbonate ions is increased by increasing the partial pressure of carbon dioxide and/or changing the pH limit to a higher level. When the concentration of organic acid ions is below the range desirable for fermentation, the concentration of bicarbonate ions is decreased by decreasing the partial pressure of carbon dioxide and/or changing the pH to a lower level.

The partial pressure of carbon dioxide can be adjusted by changing the flow rate of air or the pressure of the gaseous phase in the fermentation vessel or by introducing carbon dioxide into the fermentation vessel.

The method of this invention permits the concentration of organic acid to be controlled in any fermentation process in which organic acid is employed as a carbon source, such as the production of glutamic acid, lysine, threonine, leucine, iso leucine, phenylalanine, citric acid, $\alpha$-ketoglutaric acid, protease, amylase or microbial cells.

The organic acids for the method of this invention are assimilable such as acetic acid, fumaric acid, malic acid, gluconic acid, benzoic acid or fatty acid.

When the concentration of organic acid is controlled by the method of this invention, the concentration is accurately controlled with an allowable change of pH for fermentation.

EXAMPLE 1

Ten liters of culture medium was prepared to contain 3 g/dl casein, 5 ml/dl corn steep liquor, 0.375 g/dl $KH_2PO_4$, 0.02 g/dl $MgSO_4 \cdot 7H_2O$ and 2 ml/dl soy bean protein hydrolyzate and was placed in 30 l fermentation vessel. The medium was adjusted to pH 7.0, and was inoculated after sterilization with previously cultured Bacillus sp. AJ 3205 (FERM-P 304) which is capable of producing alkaline protease.

Fermentation was carried out aerobically at 34°C for 64 hours. During the fermentation, small amounts of 70 percent acetic acid solution were fed so as to maintain a pH from 7.8 to 8.0. When the concentration of acetic acid in the medium was below 0.2 g/dl, the partial pressure of $CO_2$ in the fermentation vessel was decreased by decreasing the rate of $CO_2$ supply from a reservoir to the fermentation vessel. When the concentration of acetic acid was above 0.5 g/dl, the partial pressure of $CO_2$ was increased by increasing the rate of $CO_2$ supply.

The pH of the medium, the concentration of acetic acid and the partial pressure of $CO_2$ are shown in FIG. 1. After the fermentation, 13,000 units/ml alkaline protease was found in the fermentation broth.

Figure 2:
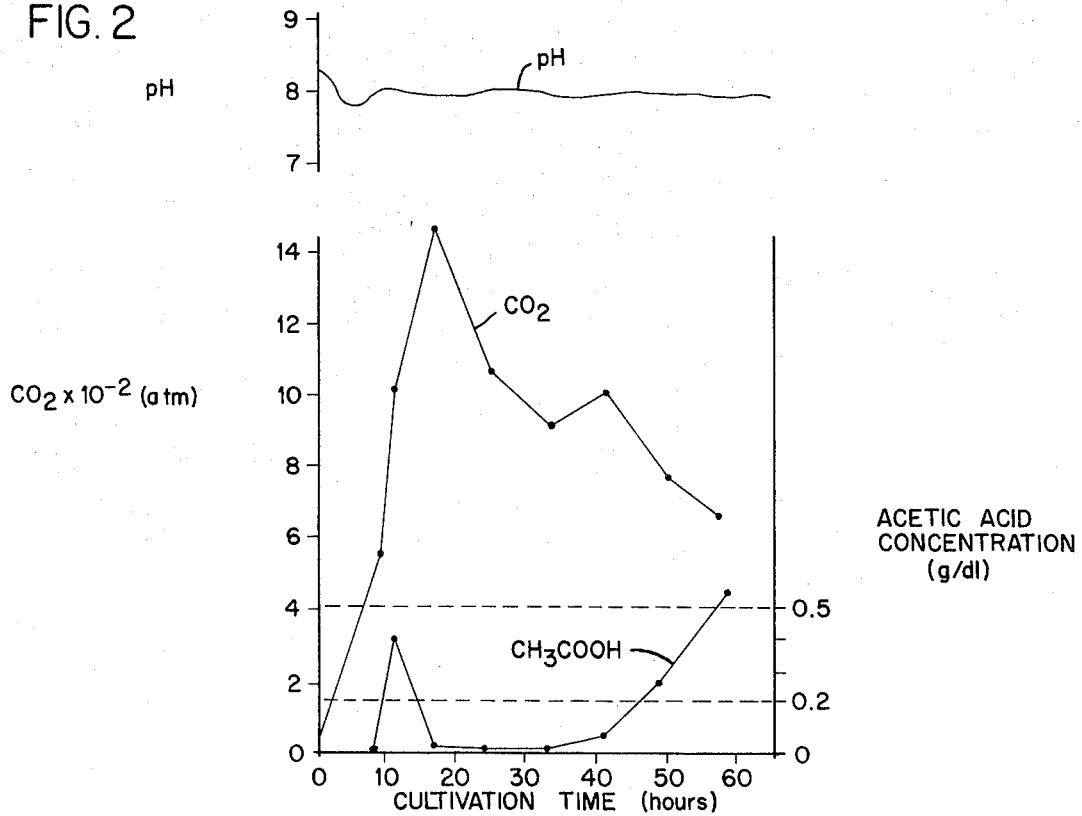

On the other hand, when the partial pressure of $CO_2$ was not controlled, acetic acid was deficient from 15 hours to 40 hours after inoculation and was excessive after 58 hours. Alkaline protease found in the fermentation broth was 5,800 units/ ml. (FIG. 2)

When acetic acid was fed to the medium so as to control the concentration of acetic acid within the range from 0.2 g/dl to 0.5 g/dl according to analytical data, the pH of the medium became too low in the earlier stage and too high in the later period of the fermentation. The alkaline protease accumulated in the fermentation broth was less than 2,000 units/ml.

EXAMPLE 2

In the same fermentation as in Example 1, when the concentration of acetic acid was below 0.15 g/dl, the pH limit for feeding 70 percent acetic acid solution, which had originally been set at 7.8, was changed to a lower value, and when the concentration was above 0.5 g/dl the pH limit was changed to a higher value.

Figure 3:
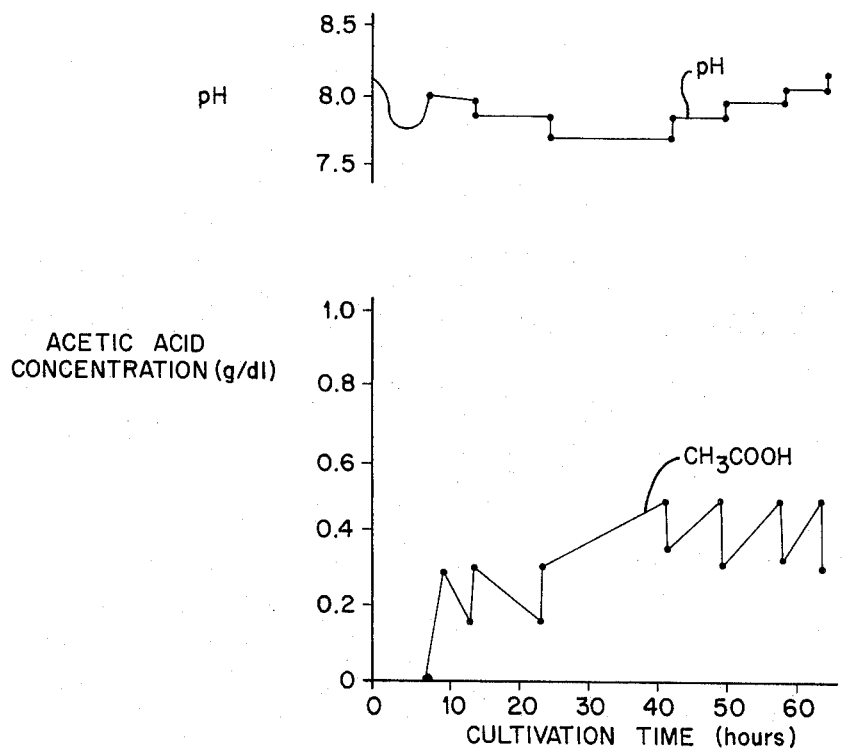

The time course of this fermentation is shown in FIG. 3. After 64 hours' cultivation, 12,800 units/ml alkaline protease was found in the fermentation broth.

EXAMPLE 3

Ten liters of a culture medium was prepared to contain 2 g/dl ammonium acetate, 1 g/dl sodium acetate, 1 $\mu$g/1 biotin, 0.5 ml/dl soybean protein acid-hydrolyzate, 100 $\mu$g/1 thiamine·HCl, 0.1 g/dl $KH_2PO_4$, 0.04 g/dl $MgSO_4 \cdot 7H_2O$, 10 mg/dl $FeSO_4 \cdot 7H_2O$ and 10 mg/dl $MnSO_4 \cdot 4H_2O$ and adjusted to pH 7.3. The medium was placed in a 30 1 fermentation vessel, sterilized by steam and inoculated with previously cultured glutamic acid-producing Brevibacterium flavum 2247 (ATCC 14067). Fermentation was carried out aerobically at 31.5°C. During the fermentation, the pH of medium was controlled within the range from 7.8 to 8.0 by adding a solution containing and ammonium acetate (acetic acid mole ratio concentration 1.0/1.1, concentration 50 percent as acetate ion). The concentration of acetic acid was controlled between 0.5 g/dl and 1.0 g/dl by changing the partial pressure of carbon dioxide in the fermentation vessel. After 40 hours' cultivation, 7.2 g/dl glutamic acid was found in the fermentation broth. The conversion rate from acetic acid was 52 percent by weight.

When the fermentation mentioned above was carried out without controlling the partial pressure of carbon dioxide, the concentration of acetic acid fluctuated from 0.0 to 1.5 g/dl, and 4.3 g/dl glutamic acid was accumulated (the conversion rate was 45 percent.

When acetic acid was fed to the culture medium so as to control the concentration of acetic acid at about 0.75 g/dl, the pH of the medium fluctuated from 5.2 to 9.0 and the amount of glutamic acid accumulated in the fermentation broth was 2.37 g/dl.

EXAMPLE 4

In the same fermentation as described in Example 3, the concentration of acetic acid was controlled within the range from 0.5 to 1.0 g/dl by changing the pH limit for feeding the solution of acetic acid and ammonium acetate described in Example 13 instead of changing the partial pressure of carbon dioxide. After 40 hours cultivation, 6.8 g/dl glutamic acid was accumulated in the fermentation broth. (The conversion rate from acetic acid to glutamic acid was 50% by weight.)

EXAMPLE 5

Ten liters of a culture medium was prepared to contain 2 g/dl ammonium benzoate, 0.2 g/dl $KH_2PO_4$, 0.7 g/dl $K_2HPO_4$, 0.01 g/dl $MgSO_4 \cdot 7H_2O$, 0.1 g/dl $(NH_4)_2SO_4$, 2 $\mu$g/1 biotine, 100 $\mu$g/1 thiamine·HCl, 0.4 ml/dl corn steep liquor and 0.25 g/dl urea, placed in 30 1 fermentation vessel and sterilized by steam.

Brevibacterium lactofermentum ATCC 13869 was inoculated in the medium, and cultured aerobically at 30°C. A benzoic acid solution (which contained 1 part of benzoic acid per 50 parts of ammonium benzoate, and 17 g/dl benzoate ion) was fed to the medium so as to maintain a pH of 7.5 to 7.7. The concentration of benzoic acid was controlled within the range from 0.5 g/dl to 1.0 g/dl by controlling the partial pressure of carbon dioxide in the fermentation vessel. After 32 hours' cultivation, 5.92 g/dl glutamic acid was produced in the fermentation broth. (the conversion rate from benzoic acid was 65.8 percent by weight)

When the concentration of benzoic acid was controlled by changing the pH limit originally set at 7.7 to a higher point or to a lower point, after 32 hours' cultivation, 5.51 g/dl glutamic acid was accumulated in the fermentation broth.

On the other hand, when the fermentation was carried out without controlling the concentration of benzoic acid, the concentration of benzoic acid fluctuated from 0.0 to 3.0 g/dl, and 2.62 g/dl of glutamic acid was accumulated.

EXAMPLE 6

Ten liters of a culture medium was prepared to contain 1.2 g/dl ammonium acetate, 0.7 g/dl $(NH_4)_2SO_4$, 0.2 g/dl $KH_2PO_4$, 0.04 g/dl $MgSO_4 \cdot 7H_2O$, 10 mg/dl $FeSO_4 \cdot 7H_2O$, 10 mg/dl $MnSO_4 \cdot 4H_2O$, 4 ml/dl soybean protein hydrolyzate, 15 mg/dl L-threonine, 30 mg/dl DL-methionine, 50 $\mu$g/1 biotine, 40$\mu$g/1 thiamine·HCl, 0.2 g/dl urea and adjusted to pH 6.5. The medium was placed in a 30 1 fermentation vessel and inoculated with Brevibacterium flavum ATCC 21129. The fermentation was carried out aerobically at 31.5°C, maintaining the pH originally within the range from 7.5 to 7.7. by feeding 60 percent acetic acid solution which contained 1 part of acetic acid and 0.5 parts ammonium acetate.

The concentration of acetic acid was controlled within the range from 0.5 to 1.0 g/dl by changing the partial pressure of carbon dioxide. After 48 hours' cultivation, 6.47 g/dl lysine was accumulated in the fermentation broth.

When the concentration of acetic acid was controlled within the same range as above by changing the pH limit, the amount of accumulated lysine was 6.38 g/dl. The highest and the lowest set limits of pH were 8.2 and 7.2 respectively.

When the concentration of acetic acid was not controlled, the concentration fluctuated from 0.0 to 3.2 g/dl,, and the amount of accumulated lysine was 4.20 g/dl.

We claim:

1. In a method of microbial fermentation in which an organic acid is consumed as a carbon source in a culture medium and replenished when the pH of the medium rises above a limit set within a predetermined range, and the concentration of said acid is controlled within an optimum range for successful fermentation, the improvement in controlling said concentration which comprises conducting the fermentation under partial carbon dioxide pressure to provide bicarbonate ions and:

a. increasing the concentration of bicarbonate ions in said medium when the concentration of said organic acid rises above said optimum range, and
b. decreasing the concentration of said bicarbonate ions in said medium when the concentration of said organic acid falls below said optimum range.

2. In a method as set forth in claim 1, said concentration of bicarbonate ions being increased and decreased by varying the partial pressure of carbon dioxide in a gaseous phase in contact with said medium.

3. In a method as set forth in claim 1, said concentration of bicarbonate ions being increased and decreased by varying the pH.

4. In a method as set forth in claim 1, said organic acid being acetic acid, fumaric acid, malic acid, gluconic acid, benzoic acid, or a fatty acid.

* * * * *